Oct. 2, 1923.  
E. D. TUBBS  
FLEXIBLE SHAFT COUPLING  
Filed Jan. 19, 1922  
1,469,738  
2 Sheets-Sheet 1

Inventor.  
Earl D. Tubbs,  
By Frederick V. Winters,  
Attorney.

Oct. 2, 1923.
E. D. TUBBS
1,469,738
FLEXIBLE SHAFT COUPLING
Filed Jan. 19, 1922    2 Sheets-Sheet 2
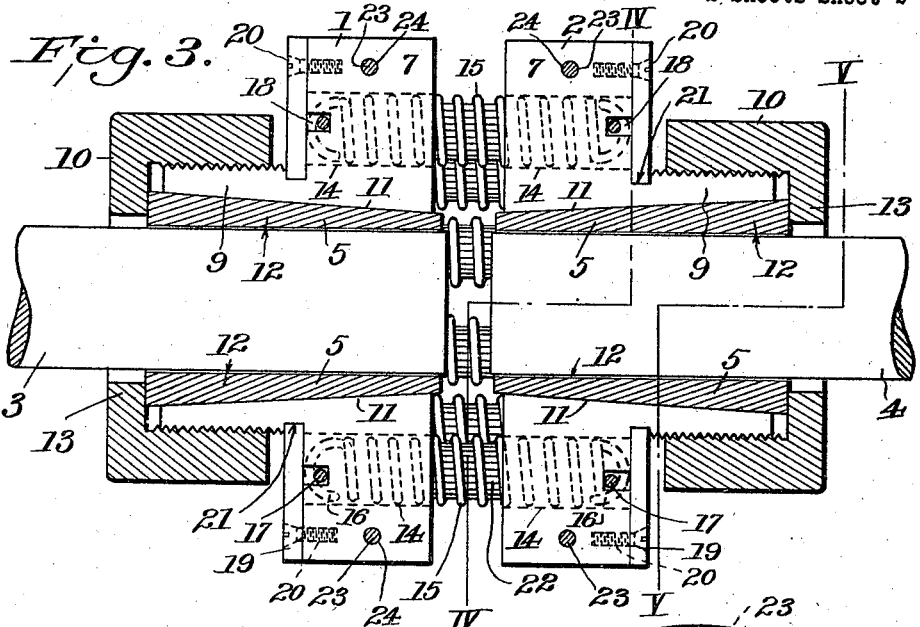
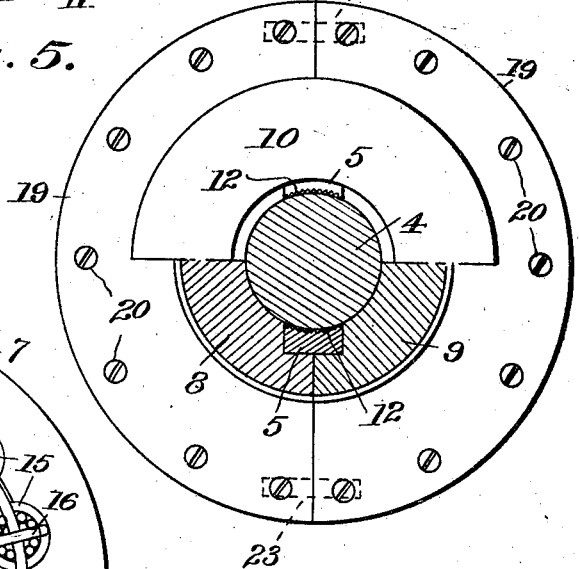
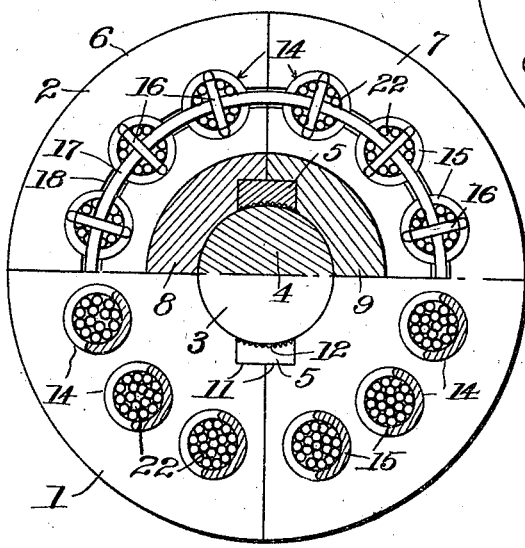
Inventor.
Earl D. Tubbs
By Frederick V. Winters,
Attorney.

Patented Oct. 2, 1923.

1,469,738

UNITED STATES PATENT OFFICE.

EARL D. TUBBS, OF NEW YORK, N. Y., ASSIGNOR TO IGOE BROTHERS, OF NEWARK, NEW JERSEY, A CORPORATION OF NEW JERSEY.

FLEXIBLE SHAFT COUPLING.

Application filed January 19, 1922. Serial No. 530,359.

*To all whom it may concern:*

Be it known that I, EARL D. TUBBS, a citizen of the United States, and resident of New York, in the county and State of New York, have invented certain new and useful Improvements in Flexible Shaft Couplings, of which the following is a full, clear, and exact specification.

This invention relates to shaft couplings and has for its object to provide an improved flexible coupling for connecting shafts which may be, or become, slightly out of line with each other.

The invention contemplates the provision of collars to be clamped upon the ends of the shafts to be connected, and flexible means for connecting said collars together in order to insure the rotation of the two shafts in unison, even though they are disposed out of alignment with each other. A further object of the invention is to provide the flexible connecting means for the collars with improved reinforcing means whereby they are rendered strong enough to withstand the stresses incident to the operation of the device. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 3 is a longitudinal section taken on the line III—III of Figure 2.

Figure 4 is a transverse section taken on the line IV—IV of Figure 3.

Figure 5 is a transverse section on the line V—V of Figure 3.

Figure 1:
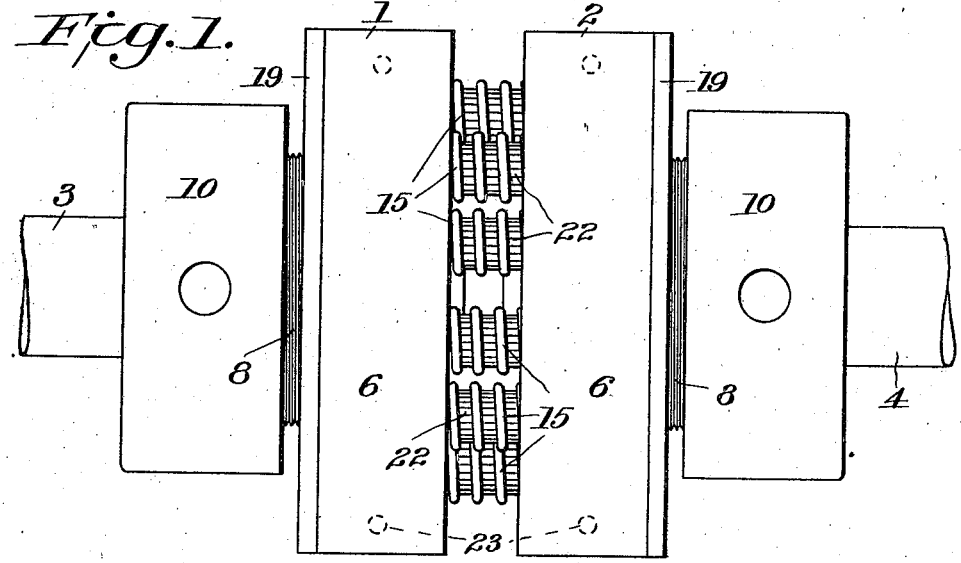
Figure 1 is a side elevation of a coupling constructed substantially in accordance with this invention and applied to the ends of two shafts.
Figure 2:
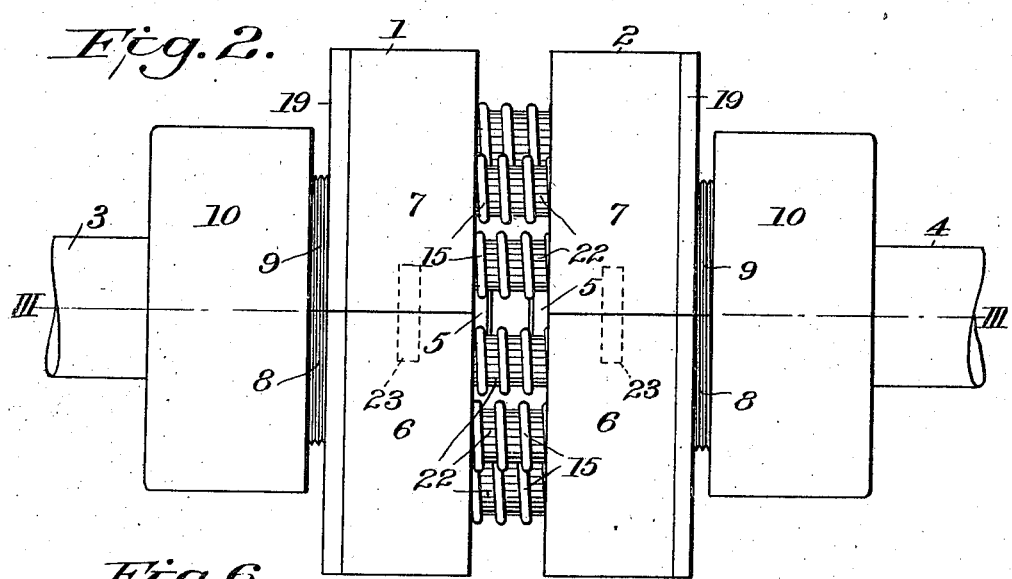
Figure 2 is a plan view of the parts as illustrated in Figure 1.
Figure 6:
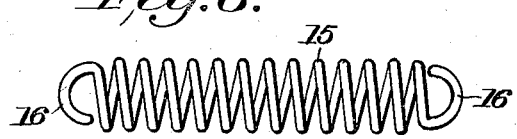
Figure 6 is a detailed view of one of the flexible connecting devices.
Figure 7:
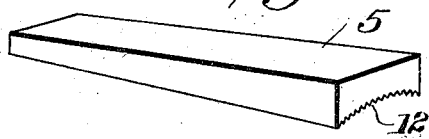
Figure 7 is a detailed view of one of the wedges used for fixing collars to the shafts.

Similarly constructed collars 1 and 2 are fastened to the ends of the shafts 3 and 4 by means of wedges 5. Each collar is made in supplemental sections 6 and 7 having externally screw threaded projections 8 and 9 extending along its shaft and adapted to receive an internally threaded cap 10 for fastening the collar sections together. Tapered grooves 11 are formed in the abutting edges of the sleeve sections and extend throughout the length of the threaded projections 8 and 9, the outer walls of said grooves converging from the outer ends of said projections toward the opposite ends of the collar sections.

The wedges 5 fit in the adjacent grooves 11 in the collar sections so as to bridge the abutting edges thereof, as best illustrated in Figure 4. The inner faces of said wedges are concave to fit the outer surface of the shafts, and have longitudinal serrations 12 adapted to bite into said shafts when the wedges are properly seated. The larger outer ends of the wedges project beyond the outer ends of the threaded projections 8 and 9, as shown in Figure 3, and are engaged by the end portion 13 of the cap 10 mounted on said projections. It will thus be seen that as said cap is screwed up on said projections 8 and 9 the wedges are forced into clamping position by said end portion 13 so as to fix each collar on its shaft.

The facing ends of the collars have longitudinally extending sockets 14 formed therein at intervals around the shafts, the sockets in one collar registering generally with those in the other collar. The collars are flexibly connected by coiled springs 15 having their ends seated in the sockets 14 and bridging the space between the collars. Each of said coiled springs 15 has loops 16 formed at its opposite ends through which rings 17 are passed for fastening said springs to the collars. Said rings are seated in grooves 18 in the outer faces of the collar sections, said grooves and the outer ends of the sockets 14 being covered by sectional plates 19 fastened to the collar sections by screws 20, see Figures 3 and 5. These sectional plates 19 fit around smooth portions 21 on the collar sections at the junctures of the threaded projections 8 and 9 therewith.

Each of the coiled springs 15 is filled with a plurality of relatively small wires or rods 22 which serve to reinforce the same and provide adequate connections between the collars and the shafts on which they are mounted. Said wires or rods are adapted to bend and slide longitudinally to a certain extent, in order to compensate for a slight difference in alignment of the shafts which may be due to the uneven settling of floors, or other conditions. The sections of each collar may be interlocked with one another by means of dowel pins 23 engaging sockets 24 in their abutting faces.

I claim:

1. In a shaft coupling, the combination with collars adapted to be fixed on the shafts to be coupled, of coiled springs connecting said collars together, and bundles of flexible reinforcing wires filling the coils of said springs and extending between the collars.

2. In a shaft coupling, the combination with collars adapted to be fixed on the shafts to be coupled, said collars having sockets in their facing ends, of coiled springs for flexibly connecting said collars together, the ends of said springs being seated in said sockets, and rings extending through the corresponding ends of the springs for fastening them in the sockets of the collars.

3. In a shaft coupling, the combination with collars adapted to be fixed on the shafts to be coupled, said collars having sockets in their facing ends, of coiled springs for flexibly connecting said collars together, the ends of said springs being seated in said sockets, said springs having loops at their opposite ends, and rings passed through the loops on corresponding ends of said springs for fastening them in the sockets of the collars.

4. In a shaft coupling, the combination with collars adapted to be fixed on the shafts to be coupled, said collars having sockets in their facing ends, of coiled springs for flexibly connecting said collars together, the ends of said springs being seated in said sockets, rings extending through the corresponding ends of the springs for fastening them in the sockets of the collars, there being annular grooves in the outer ends of said collars in which said rings are seated, and plates secured to the outer ends of said collars for covering said grooves.

In testimony whereof I have signed my name to this specification.

EARL D. TUBBS.